United States Patent
Bian

(10) Patent No.: US 12,293,036 B2
(45) Date of Patent: May 6, 2025

(54) WATERPROOF-STATE RECOGNITION AND PROCESSING METHOD AND DEVICE APPLICABLE TO CAPACITIVE TOUCH SCREEN

(71) Applicant: REALTEK SEMICONDUCTOR CORPORATION, Hsinchu (TW)

(72) Inventor: Xiao-Wei Bian, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/244,542

(22) Filed: Sep. 11, 2023

(65) Prior Publication Data
US 2024/0086006 A1    Mar. 14, 2024

(30) Foreign Application Priority Data
Sep. 14, 2022   (CN) ........................... 202211116588.8

(51) Int. Cl.
G06F 3/041    (2006.01)
G06F 3/01     (2006.01)
G06F 3/044    (2006.01)

(52) U.S. Cl.
CPC .......... *G06F 3/04166* (2019.05); *G06F 3/017* (2013.01); *G06F 3/04186* (2019.05); *G06F 3/044* (2013.01)

(58) Field of Classification Search
CPC ................................................ G06F 3/04166
(Continued)

(56) References Cited

U.S. PATENT DOCUMENTS

2019/0129556 A1*  5/2019  Hwang ............... G06F 3/04166
2020/0264727 A1*  8/2020  Lee .......................... G06F 3/044

FOREIGN PATENT DOCUMENTS

| CN | 107301006 A | 10/2017 |
| CN | 110633029 A | 12/2019 |
| TW | I603253     | 10/2017 |

OTHER PUBLICATIONS

OA letter of a counterpart TW application (appl. no. 111135620) mailed on Jul. 27, 2023. 3) Summary of the TW OA letter in regard to the TW counterpart application: (1) Claims 1-10 are rejected as being unpatentable over the cited reference 1 (CN 107301006 A) in view of the cited reference 2 (CN 110633029 A). P.S. Correspondence between the claims of the TW counterpart application and the claims of the present US application: 1) Claims 1-10 of the TW counterpart application are corresponding to claims 1-10 of the present US application respectively.

* cited by examiner

*Primary Examiner* — Long D Pham
(74) *Attorney, Agent, or Firm* — WPAT, PC

(57) ABSTRACT

A waterproof-state recognition and processing method and device is applicable to a capacitive touch screen. The method and device can differentiate a water-affected region from a water-free region, and allow a touch-responding operation for the water-free region when the water-affected region exists. The method includes: scanning the screen to obtain data of multiple channels of the screen; determining whether any of the data reaches a waterproof threshold; when any of the data reaches the waterproof threshold, performing a waterproof-state process; when none of the data reaches the waterproof threshold, determining whether any of the data reaches a finger-touch threshold; when any of the data reaches the finger-touch threshold, performing a finger-touch-state process; and when none of the data (Continued)

reaches the finger-touch threshold, performing an idle-state process.

7 Claims, 6 Drawing Sheets

(58) Field of Classification Search
  USPC .......................................................... 345/174
  See application file for complete search history.

WATERPROOF-STATE RECOGNITION AND PROCESSING METHOD AND DEVICE APPLICABLE TO CAPACITIVE TOUCH SCREEN

BACKGROUND OF THE INVENTION

1. Field of the Invention

The present disclosure relates to a waterproof-state recognition and processing method and a waterproof-state recognition and processing device, especially to a waterproof-state recognition and processing method and a waterproof-state recognition and processing device applicable to a capacitive touch screen.

2. Description of Related Art

A general capacitive touch screen detects finger touches with a circuit composed of one or more etched Indium Tin Oxide (ITO) layer(s). Take a mutual-capacitance touch screen; one or more ITO layer(s) are etched to form a set of horizontal electrodes and a set of vertical electrodes, and the overlaps of the two sets of electrodes form internal capacitors, which means that the two sets of electrodes function as the positive and negative electrodes of the internal capacitors. The two sets of electrodes are driven by a capacitance sensing chip. The capacitance sensing chip generates drive signals periodically, wherein the drive signals are inputted to one of the two sets of electrodes and outputted from the other one of the two sets of electrodes. Accordingly, the measurement of the variation in the drive signals can be used to determine whether and where finger touches occur.

A general capacitive touch screen is sensitive to the environmental variations such as temperature and humidity. When a liquid (e.g., water) is sprayed on a capacitive touch screen or a wet finger touches the capacitive touch screen, the variation in the capacitance of the aforementioned internal capacitors could be seriously affected, which may lead to a wrong result of touch detection and consequently affect a touch-responding operation. Although using hardware is enough to prevent water from influencing a capacitive touch screen, this way costs too much. Another way to detect water on a capacitive touch screen and perform a waterproof process is fulfilled with software and hardware, but this way cannot simultaneously realize the following purposes: identifying and quarantining water-affected regions accurately; preventing water-free regions from being influenced; and promptly determining whether liquid on the capacitive touch screen has been wiped out.

SUMMARY OF THE INVENTION

An object of the present disclosure is to provide a waterproof-state recognition and processing method and device as improvements over the prior art.

An embodiment of the waterproof-state recognition and processing method of the present disclosure is applicable to a capacitive touch screen, and includes the following steps: scanning the capacitive touch screen to obtain pieces of data of multiple channels of the capacitive touch screen; determining whether any of the pieces of data reaches a waterproof threshold; when any of the pieces of data reaches the waterproof threshold, performing a waterproof-state process; when none of the pieces of data reaches the waterproof threshold, determining whether any of the pieces of data reaches a finger-touch threshold; when any of the pieces of data reaches the finger-touch threshold, performing a finger-touch-state process; and when none of the pieces of data reaches the finger-touch threshold, performing an idle-state process.

An embodiment of the waterproof-state recognition and processing device of the present disclosure is applicable to a capacitive touch screen, and includes a channel scanning circuit and a data processing circuit. The channel scanning circuit is configured to scan the capacitive touch screen to obtain pieces of data of multiple channels of the capacitive touch screen. The data processing circuit is configured to execute the following operations: determining a state of the capacitive touch screen according to the pieces of data; and performing a channel data process according to the pieces of data and the state of the capacitive touch screen. The said operation of determining the state of the capacitive touch screen includes: determining whether any of the pieces of data reaches a waterproof threshold; when any of the pieces of data reaches the waterproof threshold, determining that the state of the capacitive touch screen is a waterproof state; when none of the pieces of data reaches the waterproof threshold, determining whether any of the pieces of data reaches a finger-touch threshold; when at least one of the pieces of data reaches the finger-touch threshold, determining that the state of the capacitive touch screen is a finger-touch state; and when none of the pieces of data reaches the finger-touch threshold, determining that the state of the capacitive touch screen is an idle state.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The waterproof-state recognition and processing method and device of the present disclosure are applicable to a capacitive touch screen. The method and device can differentiate water-affected regions of the capacitive touch screen from water-free regions of the capacitive touch screen, and can allow a touch-responding operation (e.g., an operation being executed in response to finger touches) for the water-free region when the water-affected regions exist.

Figure 1:
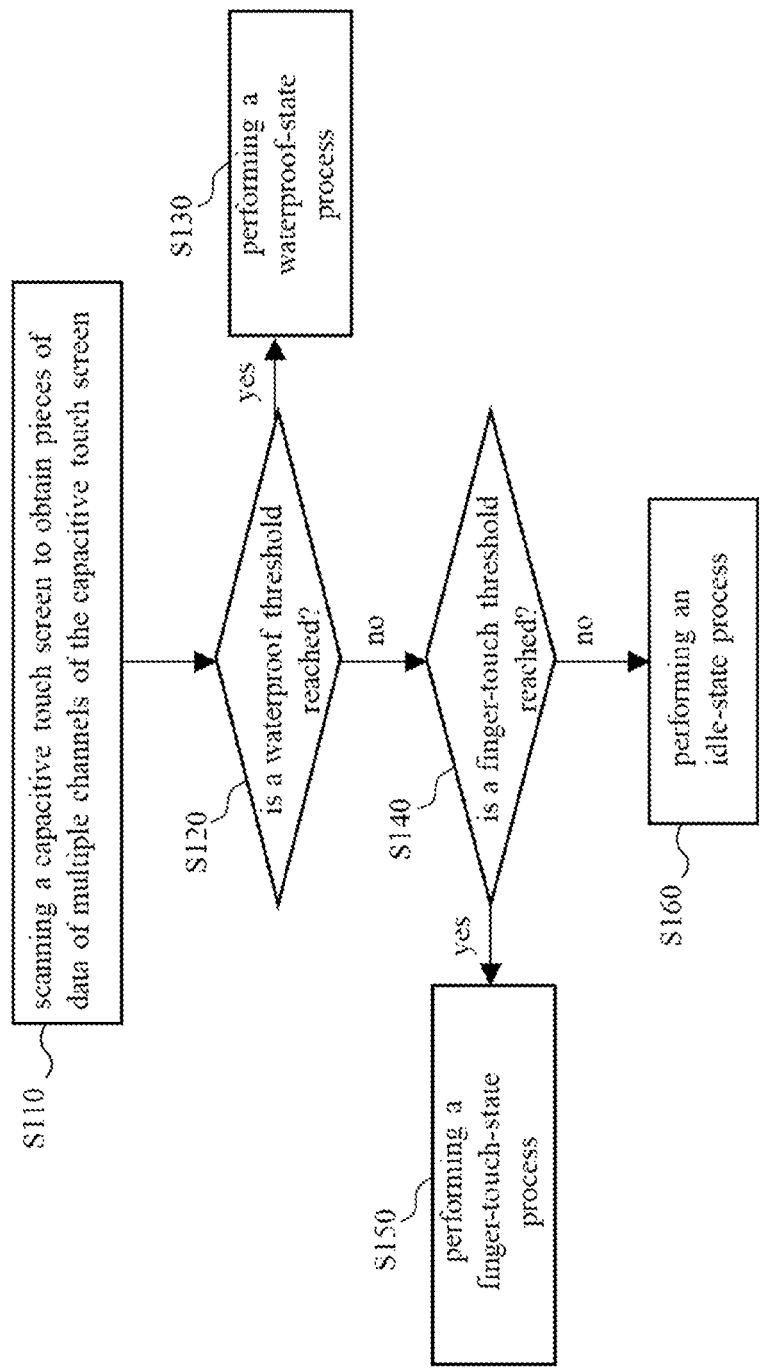
FIG. 1 shows an embodiment of the waterproof-state recognition and processing method of the present disclosure.

FIG. 1 shows an embodiment of the waterproof-state recognition and processing method of the present disclosure. This embodiment is applicable to a capacitive touch screen, and includes the following steps:

S110: after the capacitive touch screen is powered and initialized, scanning the capacitive touch screen to obtain pieces of data of multiple channels of the capacitive touch screen.

Since S110 alone can be realized with a known/self-developed technology and the way to implement S110 falls beyond the scope of the present disclosure, the detail of S110 is omitted here.

S120: determining whether any of the pieces of data reaches a waterproof threshold.

For example, in normal circumstances (e.g., circumstances without any finger touch and liquid influence) each of the pieces of data has or approximates to a reference value. For example, when a part of the capacitive touch screen is covered by water drops, some of the pieces of data will deviate from the reference value (e.g., these pieces of data having values lower than the reference value).

S130: when any of the pieces of data reaches the waterproof threshold, performing a waterproof-state process.

The detail of the waterproof-state process is found in a later paragraph.

S140: when none of the pieces of data reaches the waterproof threshold, determining whether any of the pieces of data reaches a finger-touch threshold.

For example, in normal circumstances (e.g., circumstances without any finger touch and liquid influence) each of the pieces of data has or approximates to a reference value. For example, when a part of the capacitive touch screen is touched by a finger, some of the pieces of data will deviate from the reference value (e.g., these pieces of data having values higher than the reference value).

S150: when any of the pieces of data reaches the finger-touch threshold, performing a finger-touch-state process.

The detail of the finger-touch-state process is found in a later paragraph.

S160: when none of the pieces of data reaches the finger-touch threshold, performing an idle-state process.

The detail of the idle-state process is found in a later paragraph.

It is noted that although the steps of FIG. 1 are executed in sequence from S110 to S160, these steps can be executed in other kinds of sequence, if practicable.

Figure 2:
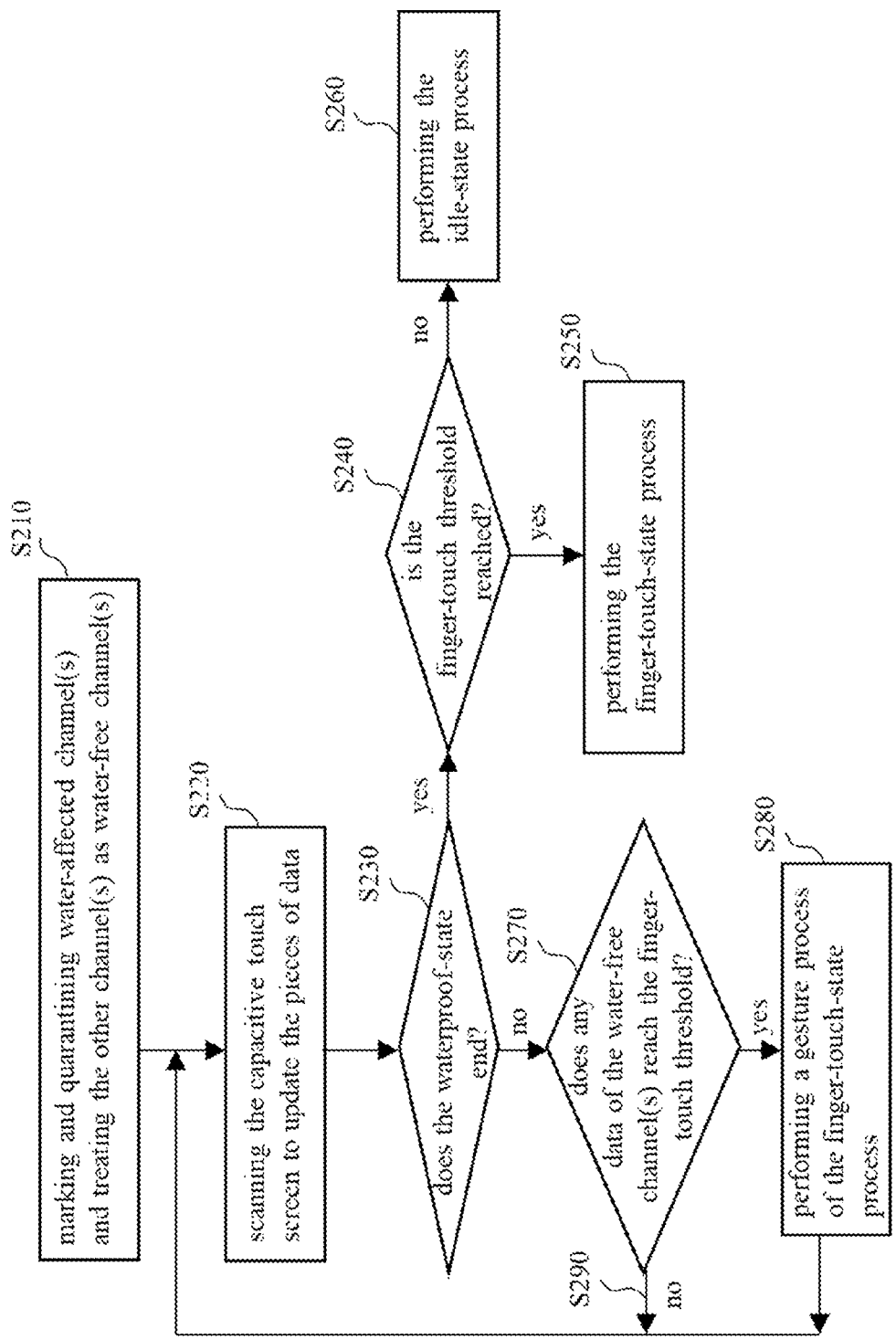
FIG. 2 shows an embodiment of the waterproof-state process of FIG. 1.

FIG. 2 shows an embodiment of the waterproof-state process. This embodiment includes the following steps:

S210: according to the pieces of data and the waterproof threshold, marking and quarantining water-affected channel(s) of the multiple channels and treating the other channel(s) (i.e., unmarked channel(s) of the multiple channels) as water-free channel(s) of the multiple channels.

It is noted that the water-affected channel(s) is/are affected by water or other kinds of liquids. Since S210 alone can be realized with a known/self-developed technology and the way to implement S210 falls beyond the scope of the present disclosure, the detail of S210 is omitted here.

S220: scanning the capacitive touch screen periodically or non-periodically to update the pieces of data.

For example, this step includes: scanning the capacitive touch screen regularly, or scanning the capacitive touch screen according to a random period within a limited range irregularly.

S230: after S220, determining whether the pieces of data reach a waterproof-state-termination condition.

For example, when none of the pieces of data reaches the waterproof threshold, this step determines that the pieces of data reach the waterproof-state-termination condition.

S240: when the pieces of data reach the waterproof-state-termination condition, determining whether any of the pieces of data reaches the finger-touch threshold.

S250: when any of the pieces of data reaches the finger-touch threshold, performing the finger-touch-state process.

S260: when none of the pieces of data reaches the finger-touch threshold, performing the idle-state process.

S270: when none of the pieces of data reaches the waterproof-state-termination condition, determining whether any piece of data of the water-free channel(s) reaches the finger-touch threshold.

S280: when at least one piece of data of the water-free channel(s) reaches the finger-touch threshold, performing a gesture process of the finger-touch-state process for identifying and responding to gesture.

Since the gesture process alone can be realized with a known/self-developed technology and the way to implement the gesture process falls beyond the scope of the present disclosure, the detail of the gesture process is omitted here.

S290: when no piece of data of the water-free channel(s) reaches the finger-touch threshold, returning to S220.

It is noted that although the steps of FIG. 2 are executed in sequence from S210 to S290, these steps can be executed in other kinds of sequence, if practicable.

Figure 3:
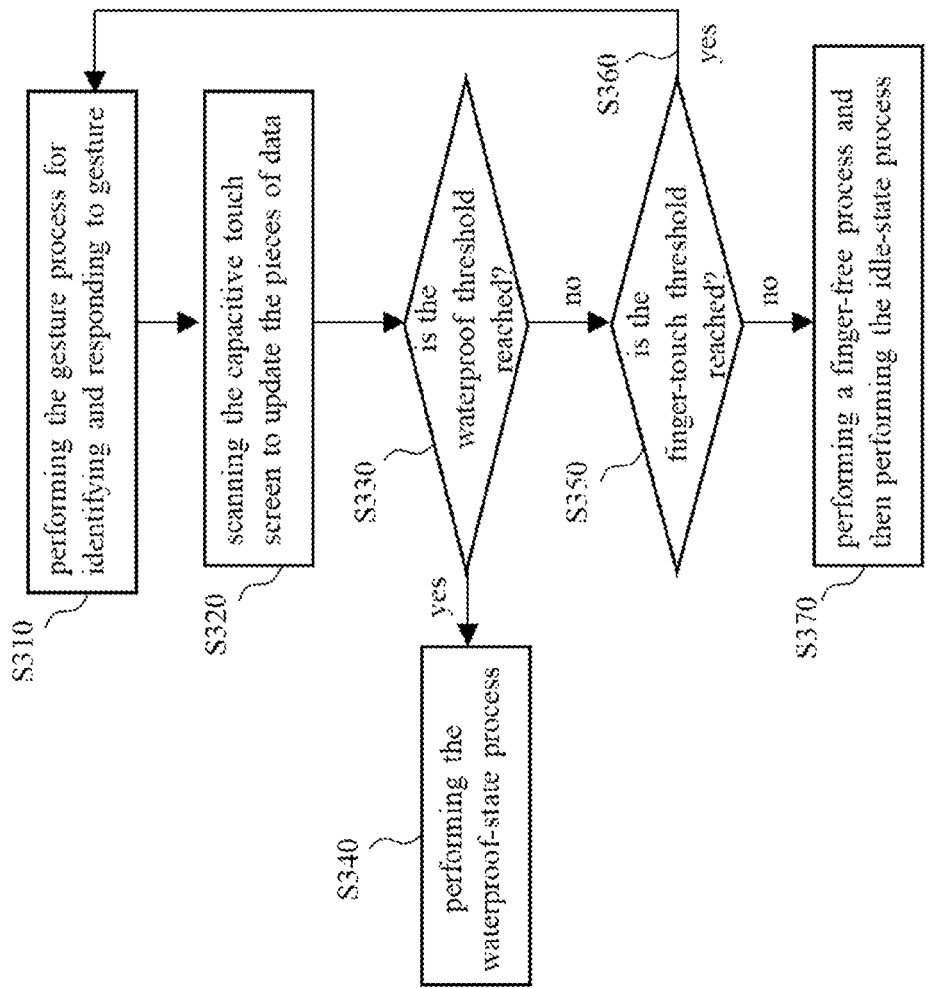
FIG. 3 shows an embodiment of the finger-touch-state process of FIG. 1.

FIG. 3 shows an embodiment of the finger-touch-state process. This embodiment includes the following steps:

S310: performing the gesture process for identifying and responding to gesture.

S320: scanning the capacitive touch screen periodically or non-periodically to update the pieces of data.

For example, this step includes: scanning the capacitive touch screen regularly, or scanning the capacitive touch screen according to a random period within a limited range irregularly.

S330: determining whether any of the pieces of data reaches the waterproof threshold.

S340: when any of the pieces of data reaches the waterproof threshold, performing the waterproof-state process.

S350: when none of the pieces of data reaches the waterproof threshold, determining whether any of the pieces of data reaches the finger-touch threshold.

S360: when any of the pieces of data reaches the finger-touch threshold, returning to S310.

S370: when none of the pieces of data reaches the finger-touch threshold, performing a finger-free process and then performing the idle-state process.

Since the finger-free process (i.e., a process for a situation that the capacitive touch screen is not touched) can be realized with a known/self-developed technology and the way to implement the finger-free process falls beyond the scope of the present disclosure, the detail of the finger-free process is omitted here.

It is noted that although the steps of FIG. 3 are executed in sequence from S310 to S370, these steps can be executed in other kinds of sequence, if practicable.

Figure 4:
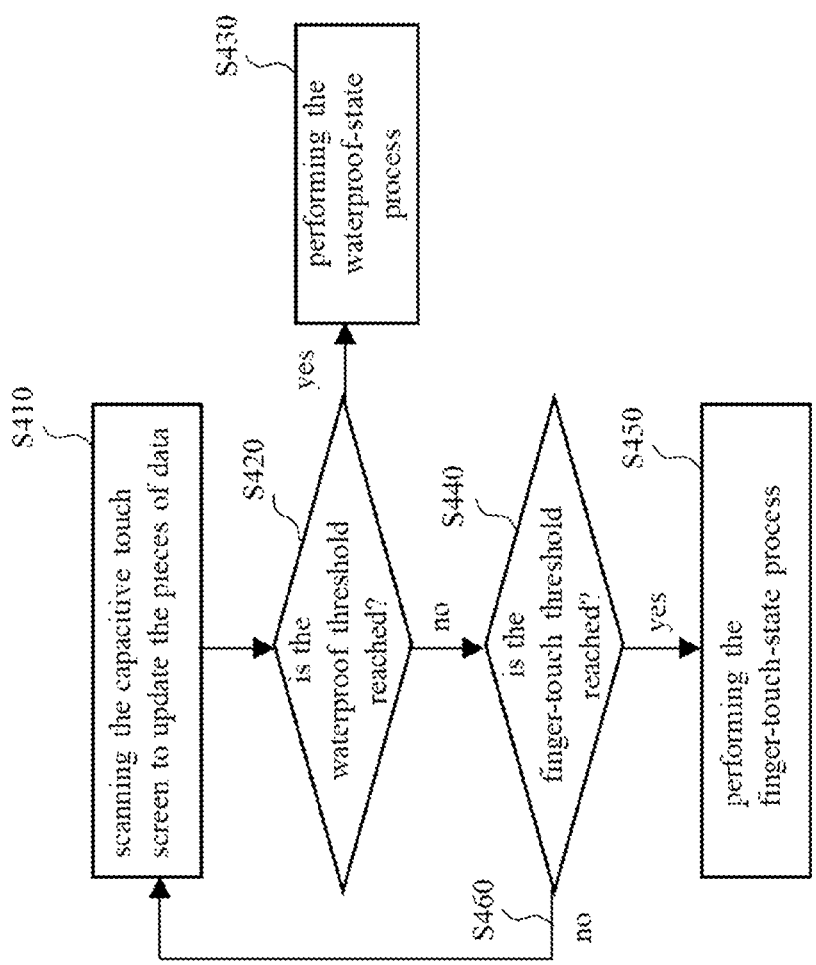
FIG. 4 shows an embodiment of the idle-state process of FIG. 1.

FIG. 4 shows an embodiment of the idle-state process. This embodiment includes the following steps:

S410: scanning the capacitive touch screen periodically or non-periodically to update the pieces of data.
   For example, this step includes: scanning the capacitive touch screen regularly, or scanning the capacitive touch screen according to a random period within a limited range irregularly.
S420: determining whether any of the pieces of data reaches the waterproof threshold.
S430: when at least one of the pieces of data reaches the waterproof threshold, performing the waterproof-state process.
S440: when none of the pieces of data reaches the waterproof threshold, determining whether any of the pieces of data reaches the finger-touch threshold.
S450: when at least one of the pieces of data reaches the finger-touch threshold, performing the finger-touch-state process.
S460: when none of the pieces of data reaches the finger-touch threshold, returning to S410.

It is noted that although the steps of FIG. 4 are executed in sequence from S410 to S460, these steps can be executed in other kinds of sequence, if practicable.

Figure 5:
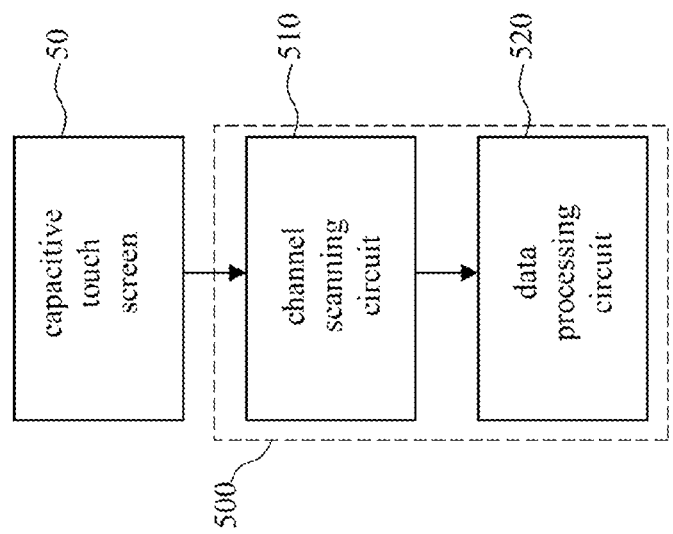
FIG. 5 shows an embodiment of the waterproof-state recognition and processing device of the present disclosure.

FIG. 5 shows an embodiment of the waterproof-state recognition and processing device of the present disclosure. The waterproof-state recognition and processing device 500 of FIG. 5 is applicable to a capacitive touch screen 50, and includes a channel scanning circuit 510 and a data processing circuit 520. The channel scanning circuit 510 and the data processing circuit 520 can be included in one touch integrated circuit (touch IC) (not shown in the figures), or the channel scanning circuit 510 and the data processing circuit 520 are included in a touch IC and a central processing unit (not shown in the figures) respectively. The channel scanning circuit 510 is a known/self-developed circuit and configured to scan the capacitive touch screen to obtain pieces of data of multiple channels of the capacitive touch screen. The data processing circuit 520 can execute a predetermined program (e.g., a program written according to the waterproof-state recognition and processing method of the present disclosure) and thereby execute the following operations: determining a state of the capacitive touch screen 50 according to the pieces of data; and performing a channel data process according to the pieces of data and the state of the capacitive touch screen. The channel data process includes: a waterproof-state process for a waterproof state; a finger-touch-state process for a finger-touch state; and an idle-state process for an idle state. Embodiments of the waterproof-state process, the finger-touch-state process, and the idle-state process are found in the preceding paragraphs.

Figure 6:
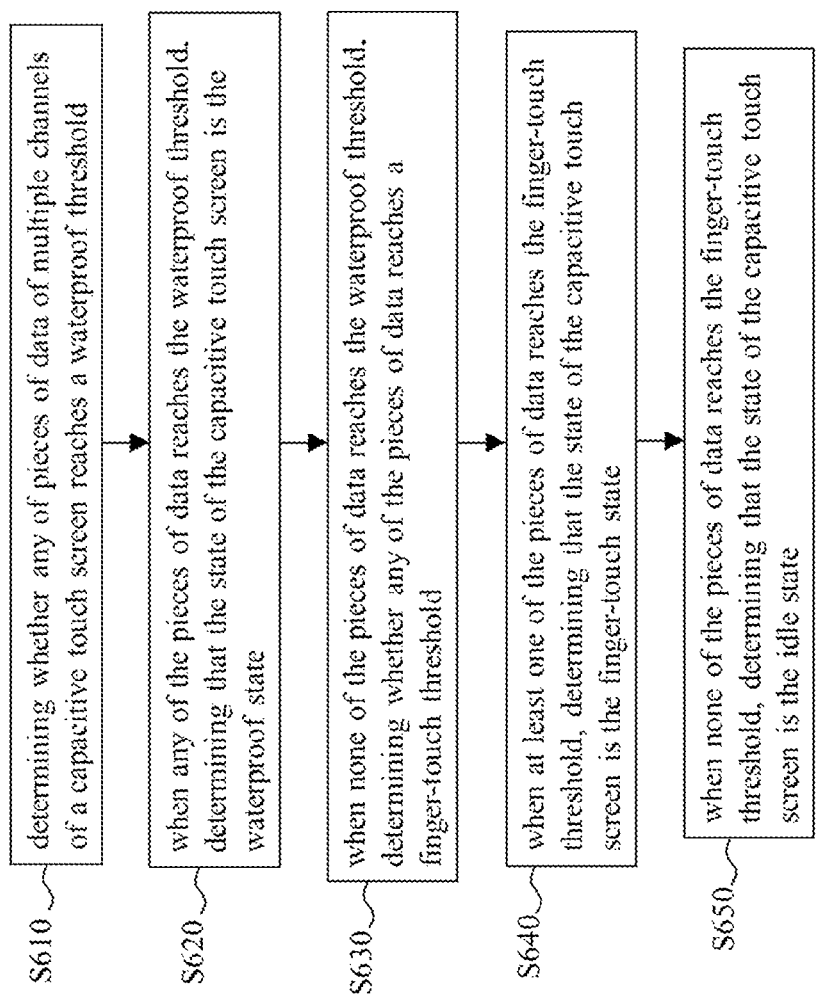
FIG. 6 shows how the data processing circuit of FIG. 5 determines the state of a capacitive touch screen.

FIG. 6 shows how the data processing circuit 520 of FIG. 5 determines the state of the capacitive touch screen 50. FIG. 6 includes the following operations:
S610: determining whether any of the pieces of data reaches a waterproof threshold.
S620: when any of the pieces of data reaches the waterproof threshold, determining that the state of the capacitive touch screen is the waterproof state.
S630: when none of the pieces of data reaches the waterproof threshold, determining whether any of the pieces of data reaches a finger-touch threshold.
S640: when at least one of the pieces of data reaches the finger-touch threshold, determining that the state of the capacitive touch screen is the finger-touch state.
S650: when none of the pieces of data reaches the finger-touch threshold, determining that the state of the capacitive touch screen is the idle state.

Since those having ordinary skill in the art can refer to the method embodiment of the present disclosure to appreciate the detail and modification of the device embodiment of the present disclosure, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the waterproof-state recognition and processing method and device of the present disclosure can fulfill the following purposes: differentiating water-affected regions of a capacitive touch screen from water-free regions of the capacitive touch screen; allowing a touch-responding operation for the water-free region when the water-affected regions exist; and promptly determining whether liquid on the capacitive touch screen has been wiped out.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A waterproof-state recognition and processing method applicable to a capacitive touch screen, the method comprising:
   scanning the capacitive touch screen to obtain pieces of data of multiple channels of the capacitive touch screen;
   determining whether any of the pieces of data reaches a waterproof threshold;
   when any of the pieces of data reaches the waterproof threshold, performing a waterproof-state process;
   when none of the pieces of data reaches the waterproof threshold, determining whether any of the pieces of data reaches a finger-touch threshold;
   when any of the pieces of data reaches the finger-touch threshold, performing a finger-touch-state process; and
   when none of the pieces of data reaches the finger-touch threshold, performing an idle-state process,
   wherein the waterproof-state process includes following steps:
      according to the pieces of data and the waterproof threshold, marking and quarantining water-affected channel(s) of the multiple channels and treating unmarked channel(s) of the multiple channels as water-free channel(s) of the multiple channels;
      scanning the capacitive touch screen periodically or non-periodically to update the pieces of data;
      after updating the pieces of data, determining whether the pieces of data reach a waterproof-state-termination condition;
      when the pieces of data reach the waterproof-state-termination condition, determining whether any of the pieces of data reaches the finger-touch threshold;
      when any of the pieces of data reaches the finger-touch threshold, performing the finger-touch-state process;
      when none of the pieces of data reaches the finger-touch threshold, performing the idle-state process;
      when none of the pieces of data reaches the waterproof-state-termination condition, determining whether any piece of data of the water-free channel(s) reaches the finger-touch threshold;

when at least one piece of data of the water-free channel(s) reaches the finger-touch threshold, performing the finger-touch-state process; and when no piece of data of the water-free channel(s) reaches the finger-touch threshold, returning to the step of scanning the capacitive touch screen periodically or non-periodically.

2. The method of claim 1, wherein the finger-touch-state process includes following steps:

performing a gesture process for identifying and responding to gesture;

scanning the capacitive touch screen periodically or non-periodically to update the pieces of data;

determining whether any of the pieces of data reaches the waterproof threshold;

when any of the pieces of data reaches the waterproof threshold, performing the waterproof-state process;

when none of the pieces of data reaches the waterproof threshold, determining whether any of the pieces of data reaches the finger-touch threshold;

when any of the pieces of data reaches the finger-touch threshold, returning to the step of performing the gesture process; and when none of the pieces of data reaches the finger-touch threshold, performing a finger-free process and then performing the idle-state process.

3. A waterproof-state recognition and processing method applicable to a capacitive touch screen, the method comprising:

scanning the capacitive touch screen to obtain pieces of data of multiple channels of the capacitive touch screen;

determining whether any of the pieces of data reaches a waterproof threshold;

when any of the pieces of data reaches the waterproof threshold, performing a waterproof-state process;

when none of the pieces of data reaches the waterproof threshold, determining whether any of the pieces of data reaches a finger-touch threshold;

when any of the pieces of data reaches the finger-touch threshold, performing a finger-touch-state process; and when none of the pieces of data reaches the finger-touch threshold, performing an idle-state process, wherein the idle-state process includes following steps:

scanning the capacitive touch screen periodically or non-periodically to update the pieces of data;

determining whether any of the pieces of data reaches the waterproof threshold;

when at least one of the pieces of data reaches the waterproof threshold, performing the waterproof-state process;

when none of the pieces of data reaches the waterproof threshold, determining whether any of the pieces of data reaches the finger-touch threshold;

when at least one of the pieces of data reaches the finger-touch threshold, performing the finger-touch-state process; and when none of the pieces of data reaches the finger-touch threshold, returning to the step of scanning the capacitive touch screen periodically or non-periodically.

4. A waterproof-state recognition and processing device applicable to a capacitive touch screen, the waterproof-state recognition and processing device comprising:

a channel scanning circuit configured to scan the capacitive touch screen to obtain pieces of data of multiple channels of the capacitive touch screen;

a data processing circuit configured to execute following operations:

determining a state of the capacitive touch screen according to the pieces of data;

and performing a channel data process according to the pieces of data and the state of the capacitive touch screen, wherein the operation of determining the state of the capacitive touch screen includes:

determining whether any of the pieces of data reaches a waterproof threshold;

when any of the pieces of data reaches the waterproof threshold, determining that the state of the capacitive touch screen is a waterproof state;

when none of the pieces of data reaches the waterproof threshold, determining whether any of the pieces of data reaches a finger-touch threshold;

when at least one of the pieces of data reaches the finger-touch threshold, determining that the state of the capacitive touch screen is a finger-touch state; and when none of the pieces of data reaches the finger-touch threshold, determining that the state of the capacitive touch screen is an idle state, wherein the channel data process includes a waterproof-state process, a finger-touch-state process, and an idle-state process, and the waterproof-state process includes operations as follows:

according to the pieces of data and the waterproof threshold, marking and quarantining water-affected channel(s) of the multiple channels and treating unmarked channel(s) of the multiple channels as water-free channel(s) of the multiple channels;

scanning the capacitive touch screen periodically or non-periodically to update the pieces of data;

after updating the pieces of data, determining whether the pieces of data reach a waterproof-state-termination condition;

when the pieces of data reach the waterproof-state-termination condition, determining whether any of the pieces of data reaches the finger-touch threshold;

when any of the pieces of data reaches the finger-touch threshold, performing the finger-touch-state process;

when none of the pieces of data reaches the finger-touch threshold, performing the idle-state process;

when none of the pieces of data reaches the waterproof-state-termination condition, determining whether any piece of data of the water-free channel(s) reaches the finger-touch threshold;

when at least one piece of data of the water-free channel(s) reaches the finger-touch threshold, performing the finger-touch-state process; and when no piece of data of the water-free channel(s) reaches the finger-touch threshold, returning to the operation of scanning the capacitive touch screen periodically or non-periodically.

5. The waterproof-state recognition and processing device of claim 4, the finger-touch-state process includes operations as follows:

performing a gesture process for identifying and responding to gesture;

scanning the capacitive touch screen periodically or non-periodically to update the pieces of data;

determining whether any of the pieces of data reaches the waterproof threshold;

when any of the pieces of data reaches the waterproof threshold, performing the waterproof-state process;

when none of the pieces of data reaches the waterproof threshold, determining whether any of the pieces of data reaches the finger-touch threshold;

when any of the pieces of data reaches the finger-touch threshold, returning to the operation of performing the gesture process; and when none of the pieces of data reaches the finger-touch threshold, performing a finger-free process and then performing the idle-state process.

6. The waterproof-state recognition and processing device of claim 4, wherein the idle-state process includes operations as follows:

scanning the capacitive touch screen periodically or non-periodically to update the pieces of data;

determining whether any of the pieces of data reaches the waterproof threshold;

when at least one of the pieces of data reaches the waterproof threshold, performing the waterproof-state process;

when none of the pieces of data reaches the waterproof threshold, determining whether any of the pieces of data reaches the finger-touch threshold;

when at least one of the pieces of data reaches the finger-touch threshold, performing the finger-touch-state process; and when none of the pieces of data reaches the finger-touch threshold, returning to the operation of scanning the capacitive touch screen periodically or non-periodically.

7. The waterproof-state recognition and processing device of claim 4, wherein both the channel scanning circuit and the data processing circuit are included in a touch integrated circuit, or the channel scanning circuit and the data processing circuit are included in the touch integrated circuit and a central processing circuit respectively.

* * * * *